United States Patent
Kiribuchi et al.

(10) Patent No.: US 11,750,129 B2
(45) Date of Patent: Sep. 5, 2023

(54) SERVO DC POWER SUPPLY SYSTEM AND MOTOR CONTROL DEVICE

(71) Applicant: OMRON Corporation, Kyoto (JP)

(72) Inventors: Takeshi Kiribuchi, Kyoto (JP); Toshiyuki Zaitsu, Kyoto (JP); Takeshi Ashida, Kyoto (JP); Masashi Doi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 81 days.

(21) Appl. No.: 17/442,215

(22) PCT Filed: Mar. 5, 2020

(86) PCT No.: PCT/JP2020/009395
§ 371 (c)(1),
(2) Date: Sep. 23, 2021

(87) PCT Pub. No.: WO2020/195677
PCT Pub. Date: Oct. 1, 2020

(65) Prior Publication Data
US 2022/0173685 A1 Jun. 2, 2022

(30) Foreign Application Priority Data
Mar. 27, 2019 (JP) .................... 2019-060608

(51) Int. Cl.
*H02P 6/16* (2016.01)
*H02P 21/22* (2016.01)
*H02P 27/08* (2006.01)

(52) U.S. Cl.
CPC ............ *H02P 21/22* (2016.02); *H02P 27/08* (2013.01); *H02P 2205/01* (2013.01)

(58) Field of Classification Search
CPC ................................. H02P 21/22; H02P 27/08
(Continued)

(56) References Cited

U.S. PATENT DOCUMENTS 5,602,689 A * 2/1997 Kadlec ................. G11B 21/10
360/78.04
2004/0238758 A1* 12/2004 Antonius Theodorus Dams ........
G03F 7/70725
250/491.1
(Continued)

FOREIGN PATENT DOCUMENTS

JP H11220900 A 8/1999
JP 2008253087 A 10/2008
(Continued)

OTHER PUBLICATIONS

Yokoo. "A Method to Design a Damping Control System for a Field Oriented Controlled Induction Motor Traction System for DC Electric Railway Vehicles." IEEJ Transactions on Industry Applications. 2015: 622-631. vol. 135, No. 6. English abstract provided. Cited in Specification.
(Continued)

*Primary Examiner* — Erick D Glass
(74) *Attorney, Agent, or Firm* — ROSSI, KIMMS & McDOWELL LLP

(57) ABSTRACT

A servo direct-current feeder system can reduce an oscillating voltage across a power feeding path. The servo direct-current feeder system includes a direct-current power supply, a plurality of motor controllers that each control a servomotor, and a power feeding path that distributes power from the direct-current power supply to the plurality of motor controllers. Each of the plurality of motor controllers includes a current control loop unit that controls a current flowing through the servomotor. The current loop unit includes a current control loop including a notch filter having a center frequency corresponding to a frequency to occur from an oscillating voltage across the power feeding path.

3 Claims, 6 Drawing Sheets

(58) Field of Classification Search
USPC .................................................... 318/400.07
See application file for complete search history.

(56) References Cited

U.S. PATENT DOCUMENTS

| | | | |
|---|---|---|---|
| 2008/0296085 A1 | 12/2008 | Suzuki | |
| 2009/0251093 A1* | 10/2009 | Miyazaki | H02P 29/50 318/611 |
| 2011/0058276 A1* | 3/2011 | Uchida | G11B 5/59622 |
| 2016/0173041 A1* | 6/2016 | Prasad | H03F 3/45475 330/9 |
| 2018/0244307 A1 | 8/2018 | Tsubaki | |
| 2019/0190402 A1 | 6/2019 | Kamatani | |
| 2020/0326670 A1* | 10/2020 | Tsuneki | G05B 13/0265 |

FOREIGN PATENT DOCUMENTS

| | | |
|---|---|---|
| JP | 2008296877 A | 12/2008 |
| JP | 6468342 B1 | 2/2019 |
| WO | 2017030067 A1 | 2/2017 |

OTHER PUBLICATIONS

International Search Report issued in Intl. Appln. No. PCT/JP2020/009395 dated May 26, 2020. English translation provided.
Written Opinion issued in Intl. Appln. No. PCT/JP2020/009395 dated May 26, 2020. English translation provided.

\* cited by examiner

SERVO DC POWER SUPPLY SYSTEM AND MOTOR CONTROL DEVICE

FIELD

The present invention relates to a servo direct-current feeder system and a motor controller.

BACKGROUND

Factories and other facilities use systems operable with pulse width modulation (PWM) that drives multiple motors with multiple remotely located servo drivers (e.g., a system including robots and their controllers). To reduce noise radiated from long cables between the motors and the servo drivers, such a system cannot use faster switching speeds. The system may also include many cables that connect the motors and the servo drivers.

This issue may be solved by servo drivers with no converters (hereafter, motor controllers) placed near each motor to allow power to be fed to the multiple motor controllers from a single direct-current (DC) power supply with a DC bus. However, in the system with this structure, an inductor-capacitor (LC) circuit at the DC bus and an inverter circuit in the motor controller may interfere with each other, thus causing an oscillating voltage across the DC bus (refer to, for example, Non-Patent Literature 1).

CITATION LIST

Non-Patent Literature

Non-Patent Literature 1: Masashi Yokoo and Keiichiro Kondo, "A Method to Design a Damping Control System for a Field Oriented Controlled Induction Motor Traction System for DC Electric Railway Vehicles," IEEJ Transactions D, Vol. 135, No. 6, pp. 622-631, 2015

SUMMARY

Technical Problem

In response to the above issue, one or more aspects of the present invention are directed to a technique for reducing an oscillating voltage across a power feeding path in a servo DC feeder system including a DC power supply, multiple motor controllers for controlling servomotors, and a power feeding path for distributing power from the DC power supply to the multiple motor controllers.

Solution to Problem

A servo direct-current feeder system according to one aspect of the present invention includes a direct-current power supply, a plurality of motor controllers that each control a servomotor, and a power feeding path that distributes power from the direct-current power supply to the plurality of motor controllers. Each of the plurality of motor controllers included in the servo direct-current feeder system includes a current control loop unit that controls a current flowing through the servomotor. The current loop unit includes a current control loop including a notch filter having a center frequency corresponding to a frequency to occur from an oscillating voltage across the power feeding path.

The servo DC feeder system with the above structure may stabilize a transfer function under an operating in which oscillation may occur in a known system due to an unstable transfer function across the entire system. The servo DC feeder system thus can reduce an oscillating voltage across the power feeding path.

The current control loop unit included in each of the plurality of motor controllers may control a current flowing through the servomotor, and the current control loop unit may include a current control loop including a plurality of notch filters having center frequencies corresponding to a plurality of frequencies to occur from an oscillating voltage across the power feeding path.

A motor controller for controlling a servomotor according to another aspect of the present invention includes a current control loop unit including a current control loop including one or more notch filters having variable center frequencies to control a current flowing through the servomotor. A servo DC feeder system including this motor controller can have a voltage less likely to oscillate across a power feeding path.

Advantageous Effects

The servo DC feeder system according to the above aspects of the present invention including a DC power supply, multiple motor controllers for controlling servomotors, and a power feeding path for distributing power from the DC power supply to the multiple motor controllers can reduce the oscillating voltage across the power feeding path.

DETAILED DESCRIPTION

Embodiments of the present invention will now be described with reference to the drawings.

Figure 1:
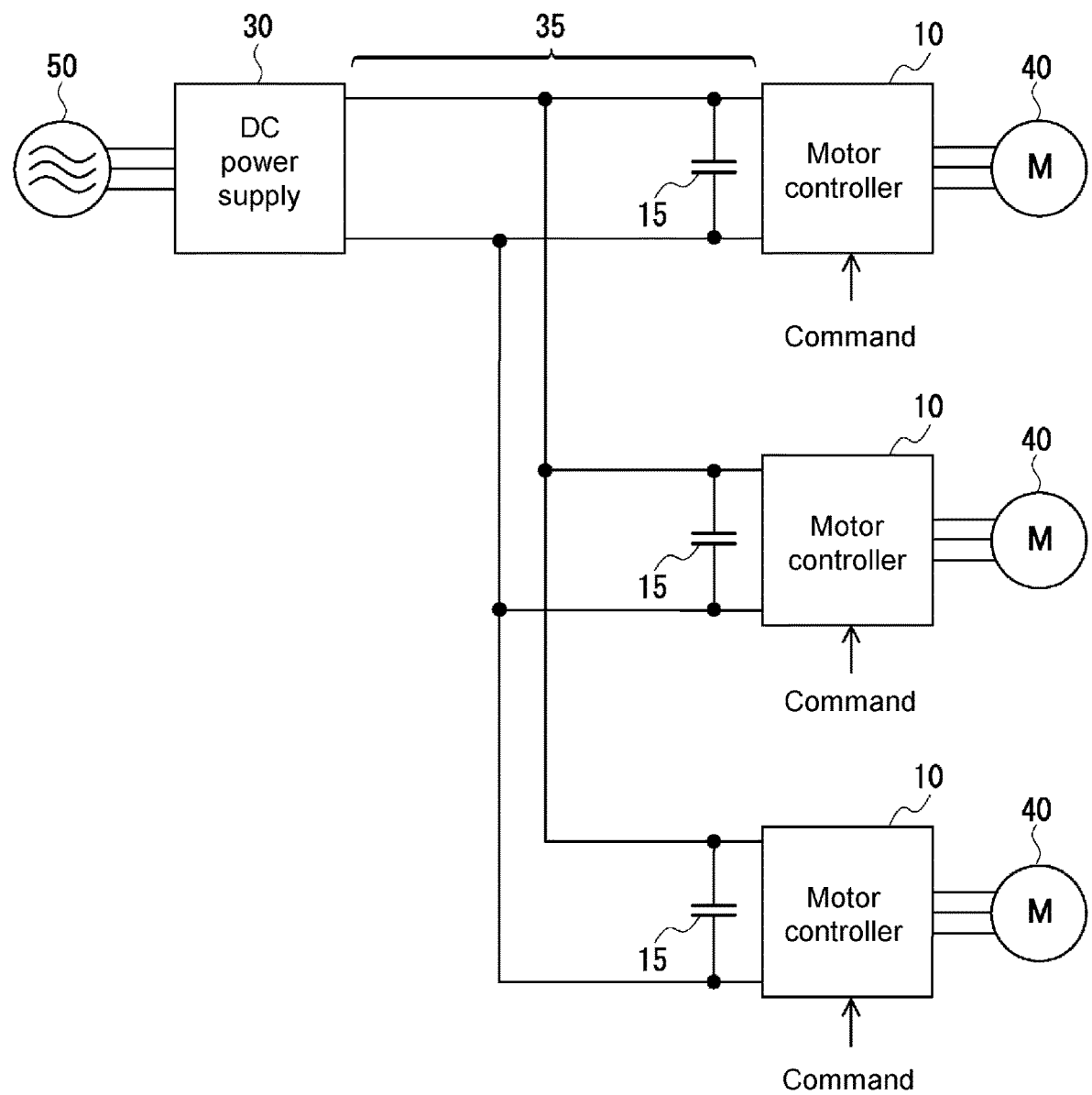
FIG. 1 is a schematic diagram of a servo DC feeder system according to one embodiment of the present invention.
Figure 2:
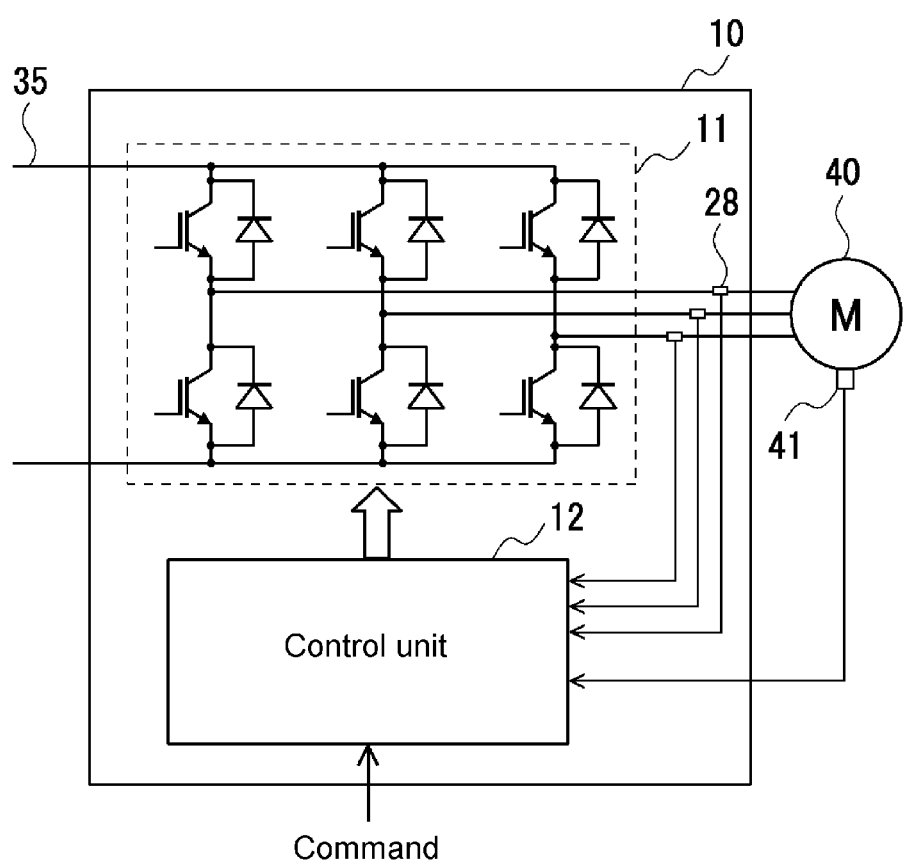
FIG. 2 is a schematic diagram of a motor controller in the servo DC feeder system.

An overview of a servo direct-current (DC) feeder system according to one embodiment of the present invention will be described with reference to FIGS. 1 and 2. FIG. 1 is a schematic diagram of the servo DC feeder system according to the present embodiment. FIG. 2 is a schematic diagram of a motor controller 10 included in the servo DC feeder system.

As shown in FIG. 1, the servo DC feeder system according to the present embodiment includes a DC power supply 30 and multiple motor controllers 10, which are connected with a power feeding path 35.

The DC power supply 30 outputs a predetermined DC voltage. Although FIG. 1 shows a device for converting a three-phase alternating current (AC) output from a three-phase AC power supply 50 into a DC voltage as the DC power supply 30, a device for converting a single-phase AC into a DC voltage may be used as the DC power supply 30. In another embodiment, the DC power supply 30 may be a rectifier circuit including diodes (e.g., a full-wave rectifier circuit) or an AC-DC converter including switching elements (e.g., a power regeneration converter).

The motor controller 10 controls a servomotor 40 (hereafter also simply referred to as a motor 40) in response to a command (e.g., a position command or a velocity command) from a host device, such as a programmable logic controller (PLC), as described in detail later. The power feeding path 35 includes multiple power cables and distributes power (current) from the DC power supply 30 to each motor controller in the servo DC feeder system with the power cables. The power feeding path 35 typically includes smoothing capacitors 15 located at its connections with the respective motor controllers 10 (between the power terminals of each motor controller 10).

As shown in FIG. 2, the motor controller 10 includes an inverter circuit 11 and a control unit 12. The inverter circuit 11 converts a DC voltage input from the power feeding path 35 into the motor controller 10 into a three-phase AC. The inverter circuit 11 has a U-phase leg, a V-phase leg, and a W-phase leg connected in parallel between positive and negative buses, and the motor controller 10 includes current sensors 28 that measure currents output from the respective legs in the inverter circuit 11.

The control unit 12 performs pulse width modulation (PWM) control over the inverter circuit 11 in response to a command from a host device, such as a PCL.

The control unit 12 includes a processor (e.g., a microcontroller or a central processing unit, or CPU), and its peripheral circuits, and receives, for example, signals from each current sensor 28 and signals from an encoder 41 (an absolute encoder or an incremental encoder) attached to the motor 40.

The servo DC feeder system according to the present embodiment will now be described in detail.
To reduce an oscillating voltage across the power feeding path 35 in the servo DC feeder system according to the present embodiment, each motor controller 10 controls a current flowing through the motor 40 using a current control loop with a notch filter.

The structure and the operation of the motor controller 10 operable in response to a position command input from the host device will now be described.

Figure 3:
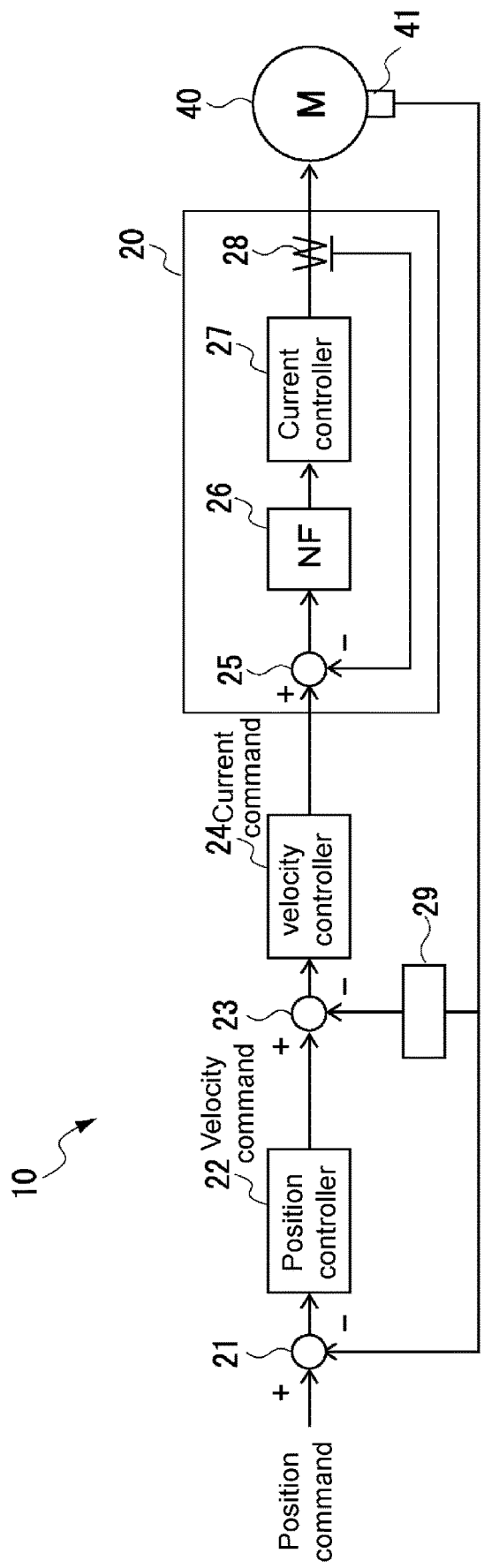
FIG. 3 is a functional block diagram of the motor controller.

When controlling the motor 40 in response to a position command, the motor controller 10 operates with the structure shown in FIG. 3, or more specifically, including subtractors 21 and 23, a position controller 22, a velocity controller 24, a current control loop unit 20 including a notch filter (NF) 26, and a velocity detector 29.

The subtractor 21 in this motor controller 10 calculates a position deviation by subtracting a position detected by the encoder 41 (hereafter, a detected position) from the position command. The position controller 22 calculates a velocity command by multiplying the position deviation by a predetermined position proportional gain. The velocity detector 29 calculates a velocity (hereafter, a detected velocity) by differentiating the detected position. The subtractor 23 calculates a velocity deviation by subtracting the detected velocity from the velocity command. The velocity controller 24 calculates a current command using a proportional integral (PI) calculation based on the velocity deviation.

The current control loop unit 20 uses feedback control to allow a current to flow through the motor 40 in response to the current command. As shown in the figure, the current control loop unit 20 includes a subtractor 25, the notch filter 26, a current controller 27, and the current sensor 28.

The subtractor 25 calculates a current deviation by subtracting a current detected by the current sensor 28 from the current command. The current controller 27 is implemented by the inverter circuit 11 and a part of the control unit 12. The part of the control unit 12 included in the current controller 27 controls the inverter circuit 11 to allow a current to flow through the motor 40 in response to the current command based on the current deviation after the notch filter 26.

The notch filter 26 in the current control loop unit 20 is a digital filter with variable center frequencies (also referred to as notch frequencies). In the servo DC feeder system according to the present embodiment, the notch filter 26 in each motor controller 10 has a center frequency substantially equal to a frequency at which a voltage across the power feeding path 35 can oscillate.

The servo DC feeder system according to the present embodiment has the above structure. The servo DC feeder system may thus reduce an oscillating voltage across the power feeding path 35.

Figure 4A:
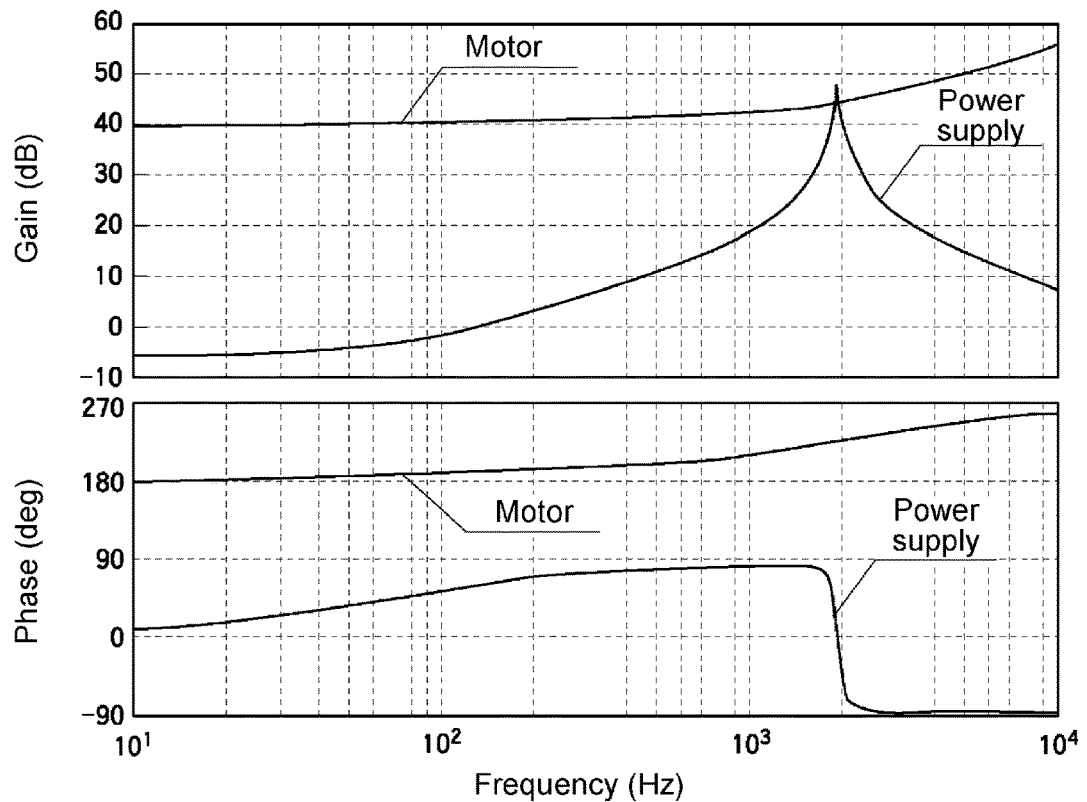
FIG. 4A is a Bode diagram for a power supply and a motor included in a comparative system.

More specifically, a servo DC feeder system includes, as each motor controller 10, a device for controlling a current flowing through the motor 40 using a current control loop without the notch filter 26. In this servo DC feeder system (hereafter, a comparative system), an oscillating voltage occurs across the power feeding path 35 in response to an unstable transfer function resulting from synthesis of transfer functions of the power feeding path 35 and the motor controller 10, or more specifically, in response to the gain of the power feeding path 35 (power supply) exceeding the gain of the motor controller 10 (motor) in a certain frequency range as schematically shown in FIG. 4A.

Figure 4B:
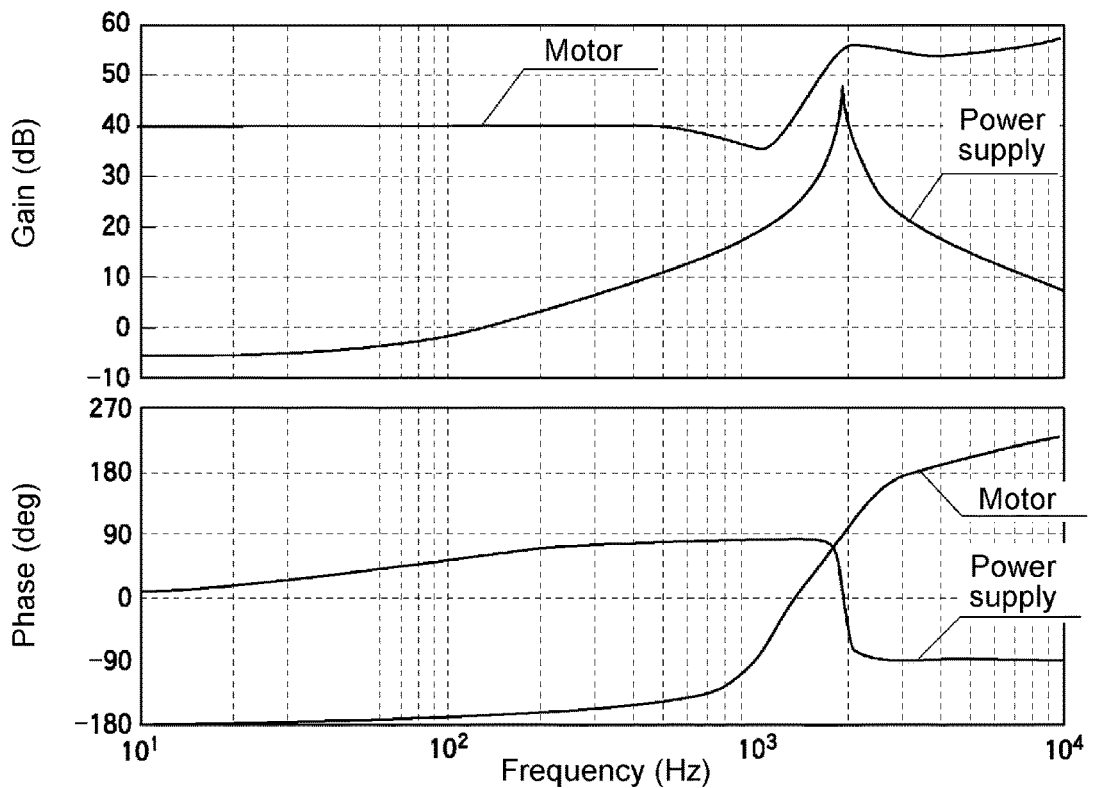
FIG. 4B is a Bode diagram for a power supply and a motor included in the servo DC feeder system.

In contrast, the servo DC feeder system according to the present embodiment includes the motor controller 10 each using the current control loop with the notch filter 26 having a center frequency corresponding to a frequency at which a voltage across the power feeding path 35 can oscillate to control the current flowing through the motor 40 and thus can maintain the gain of the power feeding path 35 (power supply) below the gain of the motor controller 10 (motor) at any frequencies, as schematically shown in FIG. 4B.

Figure 5:
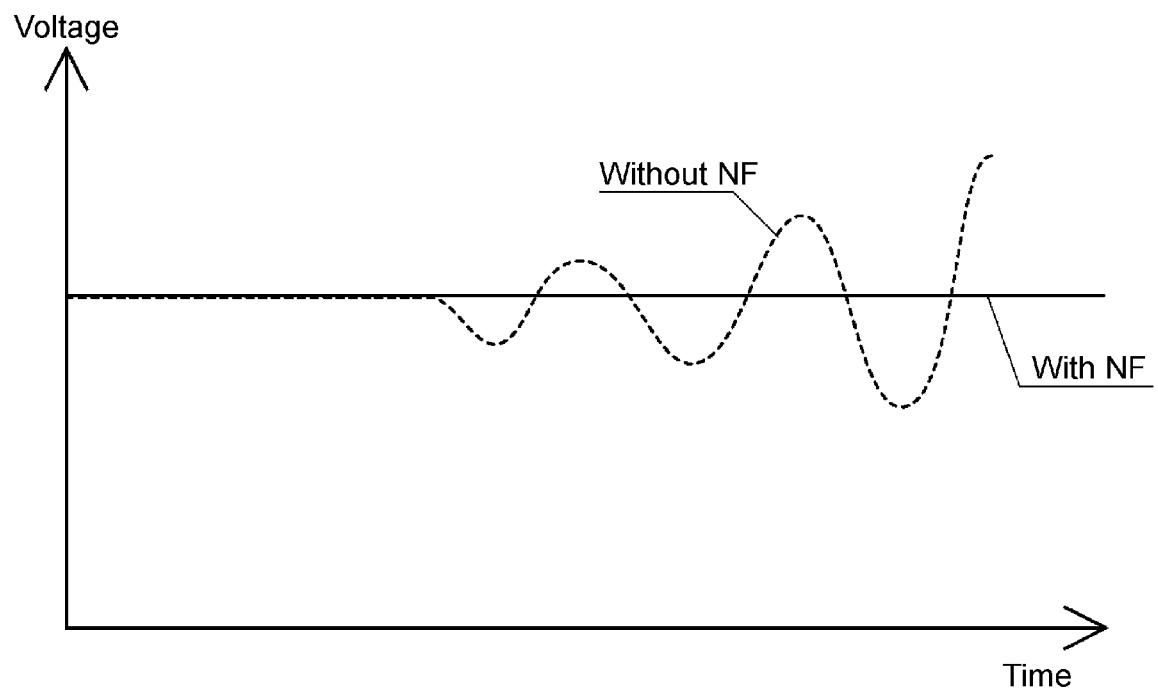
FIG. 5 is a diagram describing a difference in a voltage variation pattern of a power feeding path between the servo DC feeder system and the comparative system.

The servo DC feeder system according to the present embodiment does not cause an oscillating voltage (with NF) in operation under a condition in which the comparative system causes an oscillating voltage (without NF) shown in FIG. 5.

Modifications

Figure 6A:
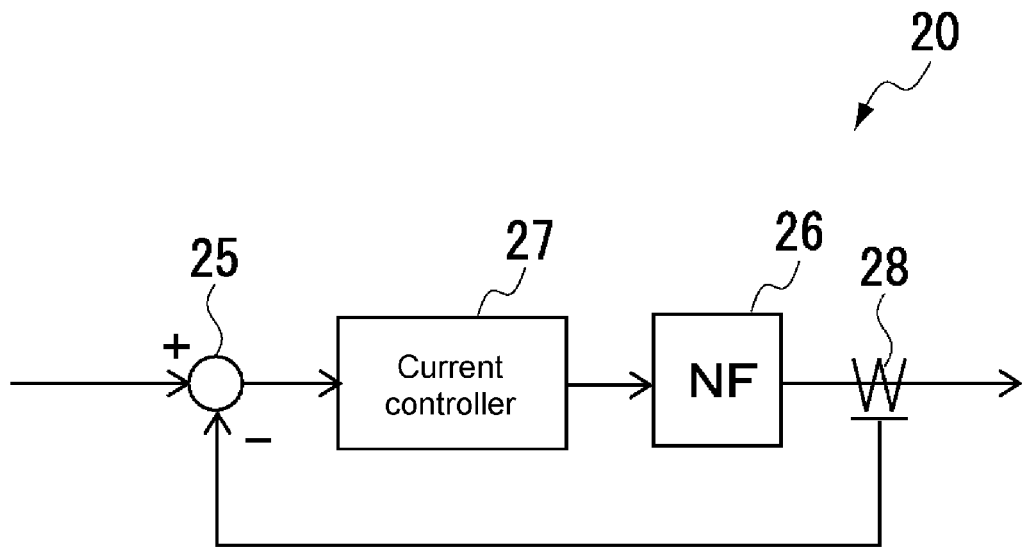
FIG. 6A is a diagram describing a current control loop unit according to a modification.

The servo DC feeder system according to the above embodiment may be modified variously. For example, the power feeding path 35 that can feed power (current) from the DC power supply 30 to all the motor controllers in the servo DC feeder system may have a structure different from the structure shown in FIG. 1. The current control loop unit 20 (FIG. 3) in the motor controller 10 may be modified to include, for example, the notch filter 26 placed downstream from the current controller 27 as shown in FIG. 6A or the notch filter 26 placed on the return path of the detected current.

Figure 6B:
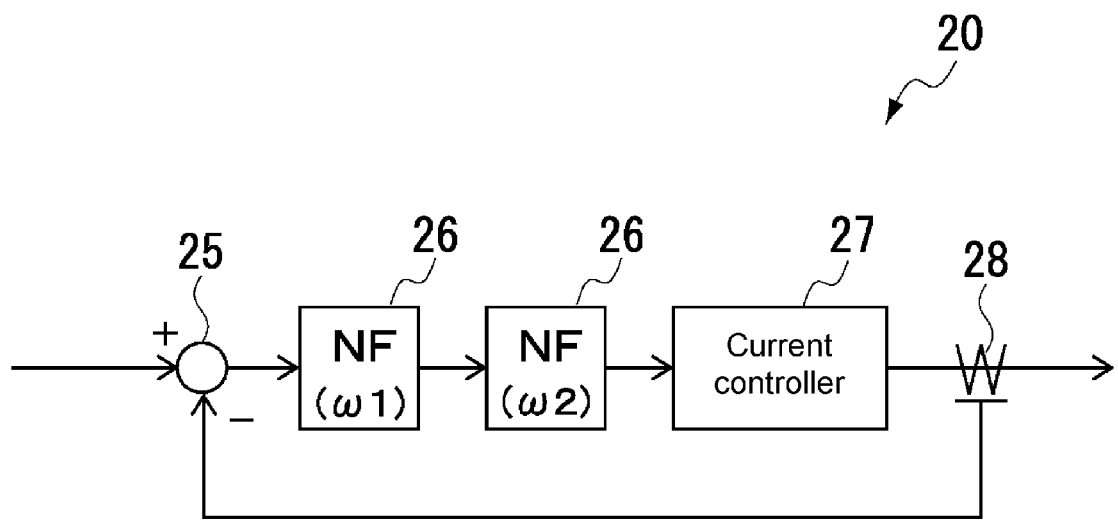
FIG. 6B is a diagram describing a current control loop unit according to a modification.

As shown in FIG. 6B, the current control loop unit 20 may also be modified to include, for example, multiple notch filters 26 that have center frequencies corresponding to multiple frequencies at which a voltage across the power feeding path 35 can oscillate (the NF 26 with the center frequency ω1 and the NF 26 with the center frequency ω2 in FIG. 6B).

Appendix 1

A servo direct-current feeder system, comprising:
a direct-current power supply (30);
a plurality of motor controllers (10) each configured to control a servomotor (40); and
a power feeding path (35) configured to distribute power from the direct-current power supply (30) to the plurality of motor controllers (10),
wherein each of the plurality of motor controllers (10) includes a current control loop unit (20) configured to control a current flowing through the servomotor (40), and the current loop unit (20) includes a current control loop including a notch filter (26) having a center frequency corresponding to a frequency to occur from an oscillating voltage across the power feeding path (35).

DESCRIPTION OF SYMBOLS

10 motor controller
11 inverter circuit
12 control unit
15 smoothing capacitor
20 current control loop unit
21, 23, 25 subtractor
22 position controller
24 velocity controller
26 notch filter
27 current controller
28 current sensor
29 velocity detector
30 DC power supply
35 power feeding path
40 servomotor
41 encoder
50 three-phase AC power supply

The invention claimed is:

1. A servo direct-current feeder system, comprising:
a direct-current power supply;
a plurality of motor controllers configured to respectively control a plurality of servomotors; and
a power feeding path configured to distribute power from the direct-current power supply to the plurality of motor controllers,
wherein each of the plurality of motor controllers includes a current control loop unit configured to control a current respectively flowing through each of the plurality of servomotors, and the current control loop unit includes a current control loop including a notch filter having a center frequency corresponding to a frequency at which a voltage across the power feeding path can oscillate in a case where a motor controller does not include the notch filter,
wherein the center frequency of the notch filter, which corresponds to the frequency at which the voltage across the power feeding path can oscillate in the case where the motor controller does not include the notch filter, is a frequency corresponding to a frequency range in which a gain corresponding to a transfer function of the power feeding path exceeds a gain corresponding to a transfer function of the motor controller in the case where the motor controller does not include the notch filter.

2. The servo direct-current feeder system according to claim 1, wherein
the current control loop includes a plurality of notch filters respectively having a plurality of center frequencies respectively corresponding to a plurality of frequencies at which the voltage across the power feeding path can oscillate in the case where the motor controller does not include the notch filter.

3. A motor controller among a plurality of motor controllers in a servo direct-current feeder system comprising a direct-current power supply, the plurality of motor controllers being configured to respectively control a plurality of servomotors, and a power feeding path configured to distribute power from the direct-current power supply to the plurality of motor controllers, the motor controller comprising:
a current control loop unit including a current control loop including one or more notch filters having center frequencies, corresponding to a frequency at which a voltage across the power feeding path can oscillate in a case where a motor controller does not include the notch filter, to control a current flowing through the servomotor,
wherein the center frequencies of the one or more notch filters, which correspond to the frequency at which the voltage across the power feeding path can oscillate in the case where the motor controller does not include the notch filter, are frequencies corresponding to a frequency range in which a gain corresponding to a transfer function of the power feeding path exceeds a gain corresponding to a transfer function of a motor controller among the plurality of motor controllers in the case where the motor controller does not include the notch filter.

* * * * *